United States Patent

Toshida et al.

Patent Number: 5,973,101
Date of Patent: Oct. 26, 1999

[54] AROMATIC POLYCARBONATE RESIN COMPOSITION

[75] Inventors: Shoichi Toshida, Moka; Takashi Nagai, Otake; Kenichi Ishiwa, Oyama, all of Japan

[73] Assignee: General Electric Company, Pittsfield, Mass.

[21] Appl. No.: 09/160,924

[22] Filed: Sep. 25, 1998

[30] Foreign Application Priority Data

| Sep. 30, 1997 | [JP] | Japan | 9-282679 |
| Sep. 30, 1997 | [JP] | Japan | 9-282680 |
| Sep. 30, 1997 | [JP] | Japan | 9-282681 |
| Sep. 30, 1997 | [JP] | Japan | 9-282682 |

[51] Int. Cl.$^6$ .................................................. C08G 64/00
[52] U.S. Cl. ........................................... 528/196; 528/198
[58] Field of Search ................................... 528/196, 198

[56] References Cited

U.S. PATENT DOCUMENTS

| 4,001,184 | 1/1977 | Scott | 528/196 |
| 4,238,569 | 12/1980 | Lim et al. | 521/52 |
| 4,238,597 | 12/1980 | Markezich et al. | 528/179 |
| 4,474,999 | 10/1984 | Mark et al. | 528/199 |
| 5,026,817 | 6/1991 | Sakashita et al. | 528/199 |
| 5,151,491 | 9/1992 | Sakashita et al. | 528/199 |

FOREIGN PATENT DOCUMENTS

| 84022743 | 5/1984 | Japan . |
| 2124934 | 5/1990 | Japan . |
| 2175722 | 7/1990 | Japan . |
| 2175723 | 7/1990 | Japan . |

*Primary Examiner*—Terressa Mosley

[57] ABSTRACT

An aromatic polycarbonate resin composition having hydroxyl groups as end groups is thermally stable and also offers excellent resistance to hydrolysis. The polycarbonate resin composition incorporates (A) an aromatic polycarbonate resin containing hydroxyl groups in the proportion of 5% or more of the total end groups and a metal impurity and (B) a deactivating agent selected from the group consisting of phosphorous acid, a thioether compound, a phosphite diester and a nitrogen-containing organic compound. The amount of deactivating agent is based on the amount of metal impurity in (A) and the type of deactivating agent.

20 Claims, No Drawings

AROMATIC POLYCARBONATE RESIN COMPOSITION

CROSS-REFERENCE TO RELATED APPLICATIONS

Not Applicable.

STATEMENT REGARDING FEDERALLY SPONSORED RESEARCH

Not Applicable.

This invention relates to resin compositions of a stabilized, aromatic polycarbonate (sometimes referred to below as PC) containing hydroxyl groups.

Conventional methods of manufacturing aromatic polycarbonates are well known. For example, the specifications of Japanese Publication of Unexamined Patent Application (Kokai) Hei 2-175723, Japanese Publication of Unexamined Patent Application (Kokai) Hei 2-124934, U.S. Pat. No. 4,001,184, U.S. Pat. No. 4,238,569, U.S. Pat. No. 4,238,597 and U.S. Pat. No. 4,474,999 describe well-known methods for synthesizing polycarbonates by ester interchange or transesterification of a dihydric phenol and carbonate diester in the molten state, or methods, particularly, interfacial methods, that react phosgene with dihydric phenol in a solvent solution.

Compared to polycarbonates obtained using phosgene methods, the amount of residual chlorine in polycarbonates derived from melt polymerization methods is extremely small because neither phosgene nor chlorine-based solvents are used. However, because melt methods polymerize by utilizing ester exchange methods, the endcapping method is often controlled by the molar ratio of the raw materials and several percent of hydroxyl groups derived from the raw material are present in the composition. In contrast, in the phosgene method (interfacial method), hydroxyl groups derived from the raw material are present based on the amount of endcapping or terminating agents.

Polycarbonates that have hydroxyl groups as end groups are stable and offer no problems whatsoever with respect to heat of short duration such as in mold forming, but they do have potential problems in that these hydroxyl groups may react with, for example, impuritiesin the polycarbonate and/or metals, etc. originating from molding machines during molding that become intermixed with the polycarbonate. The higher the processing temperature, the greater the possibility of such reactions occurring. Thus, there is a possibility that such reactions may lead to problems of unexpected discoloration and/or a reduction of molecular weight of the polycarbonate. In particular, in recent years, processing temperatures when mold forming aromatic polycarbonates for lenses and optical disks have exceeded 300° C. with the objective of achieving surface smoothness and reducing residual strain. In particular, temperatures exceeding 320° C. have become commonplace in the case of optical disks. Further, processing temperatures for extremely thin optical disks are approaching 350° C. In such high-temperature molding, the problems that demand the greatest attention are discoloration and reduction in product strength resulting from a drop in molecular weight, and polycarbonate resins with high thermal stability are therefore required to prevent such problems.

In polycarbonates manufactured by the melt-process, the most likely impurities to occur in the PC resin are metallic ions. However, because the metallic ion content often is derived from the raw materials and also from the materials used to fabricate reactors, etc., it is difficult to eliminate them entirely. Japanese Publication of Unexamined Patent Application (Kokai) Hei 2-175722 establishes that metallic ions and some amount of chlorine exist in melt-processed polycarbonates, and improves the resistance to hydrolysis by increasing the purity of the polycarbonate. Nevertheless, during secondary processing, metals or metallic ions can be introduced during mold forming from, for example, extruder barrel walls, screws, etc. Consequently, there are limitations to this method, and methods that provide greater stabilization are highly desirable in order to stabilize melt-processed polycarbonates having hydroxyl groups.

The objective of this invention is to provide an aromatic carbonate resin composition having hydroxyl groups as end or terminal groups which is thermally stable and has excellent resistance to hydrolysis.

The result of diligent study of the stabilization of hydroxyl-containing polycarbonates by the inventors has led to the concept that it would be desirable to predict the interaction of hydroxyl groups with metals in advance and deactivate the action of the metals to prevent problems of discoloration. Accordingly, the inventors discovered that adding to a polycarbonate containing hydroxyl groups and a metal from about 1 to about 100 moles of phosphorous acid or from about 1 to about 1,000 moles of a thioether compound or from about 1 to about 1,000 moles of a phosphite diester for each mole of metal or a nitrogen-containing organic compound which is a heavy metal deactivating agent in an amount of from about 10 to about 500 ppm per part by weight of the aromatic polycarbonate causes the aromatic polycarbonate having such hydroxyl groups to become exceptionally stable and arrived at this invention.

This invention provides a polycarbonate resin composition comprising (A) an aromatic polycarbonate resin containing hydroxyl groups in the proportion of least 5% of total end groups and a metal impurity and (B) an amount of a deactivating agent selected from the group consisting of phosphorous acid wherein the amount is from about 1 to about 100 moles per mole of metal impurity contained in component (A), a thioether compound wherein the amount is from about 1 to about 1,000 moles per mole of metal impurity contained in component (A), a phosphite diester wherein the amount is from about 1 to about 1,000 moles per mole of metal impurity contained in component (A) or a nitrogen-containing organic compound which is a heavy metal deactivating agent in an amount of from about 10 to about 500 ppm per part by weight of the aromatic polycarbonate.

One embodiment of this invention provides a polycarbonate resin composition characterized in that it incorporates (A) an aromatic polycarbonate resin containing hydroxyl groups in the proportion of least 5% of total end groups and (B) phosphorous acid, and the amount of (B) phosphorous acid contained therein is in the proportion of from 1 to 100 moles per mole of metal impurity contained in constituent (A).

A second embodiment of this invention provides a polycarbonate resin composition containing (A) an aromatic polycarbonate resin containing 5% or more of hydroxyl groups with respect to the total end groups and (B) a thioether compound, in which the amount of (B) the thioether compound contained therein is 1 to 1,000 moles per mole of metal impurities contained in component (A).

A third embodiment of this invention provides a polycarbonate resin composition containing (A) an aromatic polycarbonate resin containing 5% or more of hydroxyl groups with respect to the total end groups and (B) a phosphite diester, in which the amount of (B) the thioether compound contained therein is 1 to 1,000 moles per mole of metal impurities contained in component (A).

A fourth embodiment of this invention provides a polycarbonate resin composition containing (A) an aromatic polycarbonate resin containing 5% or more of hydroxyl groups with respect to the total end groups and (B) a phosphite diester, in which the amount of (B) the thioether compound contained therein is a nitrogen-containing organic compound which is a heavy metal deactivating agent in an amount of from about 10 to about 500 ppm per part by weight of the aromatic polycarbonate.

It is preferable that the aforementioned aromatic polycarbonate resin be manufactured by a melt polymerization reaction of a carbonate diester with an aromatic dihydroxyl compound. During the melt polymerization, it is preferable to use from 1×10−8 to 1×10−4 mole of an alkali metal compound or alkaline earth metal compound, and further, from 1×10−6 to 1×10−1 mole of a basic compound per mole of aromatic dihydroxyl compound as catalysts in the melt polymerization reaction.

In most instances, the aforementioned metal impurity is a compound of iron. It is preferable to base the level of deactivating agent on the level of iron in the aromatic polycarbonate resin.

In this invention, the aromatic polycarbonate resin containing hydroxyl groups in the proportion of at least 5% of total end groups (A) is an aromatic homo-polycarbonate or co-polycarbonate obtained by reacting a carbonate precursor with an aromatic dihydroxy compound. In addition, the aromatic polycarbonate may be branched. Such branched polycarbonates can be obtained by reacting a polyfunctional aromatic compound with an aromatic dihydroxy compound and a carbonate precursor to make a branched thermoplastic branched polycarbonate.

There are no particular limitations on the molecular weight of the aromatic polycarbonate resin (A) component, but from a practical standpoint, it is preferable that it have an limiting viscosity [η] of from 0.3 to 0.7 as measured in ethylene chloride at 20° C. using a Ubbelohde viscometer.

The method of manufacturing polycarbonates described is public knowledge per se. Specifically, they can be manufactured by bringing about an ester exchange reaction of a carbonate diester with an aromatic dihydroxy compound (for example, dihydric phenol) in the melt. Or, they can be manufactured by methods (particularly, interfacial methods) that react phosgene with an aromatic dihydroxy compound (for example, dihydric phenol) in a liquid solution. Polycarbonate fabrication methods are described in the specifications of Japanese Publication of Unexamined Patent Application (Kokai) Hei 2-175723, Japanese Publication of Unexamined Patent Application (Kokai) Hei 2-124934, U.S. Pat. No. 4,001,184, U.S. Pat. No. 4,238,569, U.S. Pat. No. 4,238,597 and U.S. Pat. No. 4, 474,999.

The melt method is described in detail below.

There are no particular limitations on the aromatic hydroxyl compound and a variety of well known compounds having phenolic hydroxyl groups can be used. Such compounds, for example, have the general formula

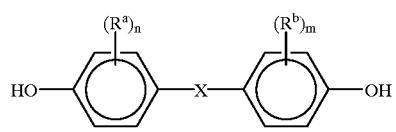

In the above-mentioned formula, Ra and Rb, independent of each other, are selected from among a halogen, for example, chlorine, bromine, fluorine, iodine and an alkyl group having from 1 to 8 carbons atoms, and, when Ra or Rb are plural in number, that is to say, when n=2 to 4 and/or m=2 to 4, it is acceptable for either Ra or Rb to be identical or different; n and m being an integer between 0 and 4, respectively; and X being selected from among a single bond, an alkylene group having from 1 to 8 carbon atoms, an alkylidene group having from 2 to 8 carbon atoms, a cycloalkylene group having from 5 to 15 carbons, a cycloalkylidene having from 5 to 15 carbon atoms, and an —S—, —SO—, —SO2—, —CO—, —O— bond, and a bond represented by the following formula:

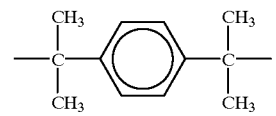

Preferred aromatic dihydroxy compounds include dihydroxy arylalkanes such as
bis-(4-hydroxyphenyl)-methane,
1,1-bis-(4-hydroxyphenyl)-ethane,
1,2-bis-(4-hydroxyphenyl)-ethane,
bis-(4-hydroxyphenyl)-diphenyl-methane,
bis-(4-hydroxyphenyl)-diphenyl-methane,
2,2-bis-(4-hydroxyphenyl)-propane,
2,2-bis-(4-hydroxyphenyl)-butane,
1,1-bis-(4-hydroxyphenyl)-cyclohexane,
bis-(3,5-dimethyl-4-hydroxyphenyl)-methane,
1,1-bis-(3,5-dimethyl-4-hydroxyphenyl)-ethane,
1,2-bis-(3,5-dimethyl-4-hydroxyphenyl)-ethane,
2,2-bis-(3,5-dimethyl-4-hydroxyphenyl)-propane,
2,2-bis-(3,5-dimethyl-4-hydroxyphenyl)-butane,
bis-(3,5-dimethyl-4-hydroxyphenyl)-phenyl-methane,
bis-(3,5-dimethyl-4-hydroxyphenyl)-diphenyl-methane,
bis-(3,5-dichloro-4-hydroxyphenyl)-methane,
2,2-bis-(3,5-dichloro-4-hydroxyphenyl)-methane,
bis-(3,5-dibromo-4-hydroxyphenyl)-methane,
2,2-bis-(3,5-dibromo-4-hydroxyphenyl)-propane, etc.;
dihydroxy arylsulfones such as
bis-(4-hydroxyphenyl)-sulfone,
bis-(3,5-dimethyl-4-hydroxyphenyl)-sulfone,
bis-(3,5-dibromo-4-hydroxyphenyl)-sulfone, etc.;
dihydroxy arylethers such as
bis-(4-hydroxyphenyl)-ether,
bis-(3,5-dimethyl-4-hydroxyphenyl)-ether,
bis-(3,5-dibromo-4-hydroxyphenyl)-ether, etc.;
dihydroxy arylsulfides such as
bis-(4-hydroxyphenyl)-sulfide,
bis-(3,5-dimethyl-4-hydroxyphenyl)-sulfide,
bis-(3,5-dibromo-4-hydroxyphenyl)-sulfide, etc.;
dihydroxy arylketones such as
4,4'-dihydroxybenzophenone; or
sulfoxones such as
bis-(4-hydroxyphenyl)-sulfoxone.
Among these, 2,2-bis-(4-hydroxyphenyl)-propane (commonly known as bisphenol A or BPA) is more preferable.

In addition to the above-mentioned substances, compounds represented by the following general formula

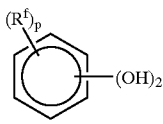

here, Rf is a hydrocarbon group having from 1 to 10 carbon atoms or its halogenide, or a halogen atom, p being an integer from 0 to 4, for example, resorcin as well as substituted resorcins such as
3-methyl-resorcinol,
3-ethyl-resorcinol,
3-propyl-resorcinol,
3-butyl-resorcinol,
3-t-butyl-resorcinol,
3-phenyl-resorcinol,
3-cumyl-resorcinol,
2,3,4,6-tetrafluoro-resorcinol,
2,3,4,6-tetrabromo-resorcinol, etc.;
catechol;
hydroquinone as well as substituted hydroquinones such as
3-methyl-hydroquinone,
3-ethyl-hydroquinone,
3-propyl-hydroquinone,
3-butyl-hydroquinone,
3-t-butyl-hydroquinone,
3-phenyl-hydroquinone,
3-cumyl-hydroquinone,
2,3,5,6-tetramethyl-hydroquinone,
2,3,5,6-tetra-t-butyl-hydroquinone,
2,3,5,6-tetrafluoro-hydroquinone,
2,3,5,6-tetrabromo-hydroquinone, etc.;
as well as . . . 2,2,2',2'-tetrahydro-3,3,3',3'-tetramethyl-1,1'-spirobis-(1H-indene)-7,7'-diol, etc., represented by the formula

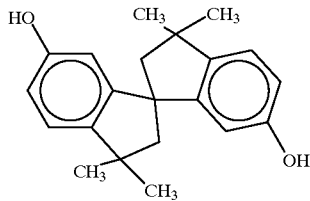

and a substituted indane bisphenol compound as taught in U.S. Pat. No. 5,703,197, expressly incorporated herein by reference, at column 6, lines 10 to 24, the most preferred species of which is 5-hydroxy-3-(4-hydroxyphenyl)-1,1,3-trimethylindane which gives a structure as set forth in the formula below

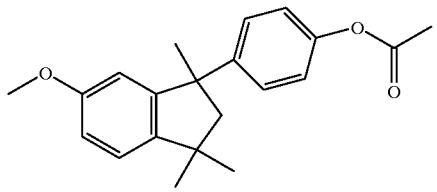

when incorporated into the polycarbonate copolymer. can be used as the aromatic dihydroxy compound.

It is acceptable to use these aromatic hydroxy compounds alone, or it is acceptable to use two or more compounds in combination.

There are no particular restrictions on the carbonate diester, and diphenyl carbonate, ditolyl carbonate, bis-(chlorophenyl) carbonate, m-cresyl carbonate, dibutyl carbonate, bis-(diphenyl) carbonate, diethyl carbonate, dimethyl carbonate, dibutyl carbonate, dicyclohexyl carbonate, etc., can be cited as examples, but it is not restricted to these. It is preferable to use diphenyl carbonate.

It is also acceptable to use these carbonate esters either alone or in combinations of two or more.

In addition to these, it is also acceptable that it contain a dicarboxylic acid or a dicarboxylic ester as acid components. Aromatic dicarboxylic acid compounds such as
terephthalic acid,
isophthalic acid,
diphenyl terephthalate,
diphenyl isophthalate, etc.;
aliphatic dicarboxylic acid compounds such as
succinic acid,
glutaric acid,
adipic acid,
pimelic acid,
suberic acid,
azelaic acid,
sebacic acid,
decanedioic acid,
dodecanedioic acid,
diphenyl sebacate,
diphenyl decanedioate,
diphenyl dodecanedioate, etc.; and
alicyclic dicarboxylic acid compounds such as
cyclopropane-dicarboxylic acid,
1,2-cyclobutane dicarboxylic acid,
1,3-cyclobutane dicarboxylic acid,
1,2-cyclopentane dicarboxylic acid,
1,3-cyclopentane dicarboxylic acid,
1,2-cyclohexene dicarboxylic acid,
1,3-cyclohexene dicarboxylic acid,
1,4-cyclohexene dicarboxylic acid,
diphenyl cyclopropanedicarboxylate,
diphenyl 1,2-cyclobutanedicarboxylate,
diphenyl 1,3-cyclobutanedicarboxylate,
diphenyl 1,2-cyclopentanedicarboxylate,
diphenyl 1,3-cyclopentanedicarboxylate,
diphenyl 1,2-cyclohexenedicarboxylate,
diphenyl 1,3-cyclohexenedicarboxylate,
diphenyl 1,4-cyclohexenedicarboxylate, etc.,
can be cited as examples of dicarboxylic acids or dicarboxylic esters.

It is also acceptable to use these dicarboxylic acids or dicarboxylic esters either alone or in combinations of two or more.

It is preferable that the amount of dicarboxylic acid or dicarboxylic ester contained in the above-mentioned carbonate diester be less than 50 mole percent, and even more preferable that it be less than 30 mole percent.

When manufacturing an aromatic polycarbonate, a polyfunctional compound having at least three functional groups in the molecule can be used together with an aromatic dihydroxyl compound and a carbonate diester. It is preferable that these polyfunctional compounds be a compound having a phenolic hydroxyl group or a carboxyl. In particular, compounds containing three phenolic hydroxyl groups are more preferred. As specific examples of these preferred compounds,
1,1,1-tris-(4-hydroxyphenyl)-ethane,
2,2',2"-tris-(4-hydroxyphenyl)-di-isopropylbenzene,
α-methyl-α,α',α"-tris-(4-hydroxyphenyl)-1,4-diethylbenzene, α,α',α"-tris-(4-hydroxyphenyl)-1,3,5-tri-isopropylbenzene,
flouroglycine,
4,6-methyl-2,4,6-tri-(4-hydroxyphenyl)-heptane-2,
1,3,5-tri-(4-hydroxyphenyl)-benzene,
2,2-bis-(4,4'(4,4'-hydroxyphenyl)cyclohexyl)-propane,
trimellitic acid,
1,3,5-benzene-tricarboxylic acid,
pyromellitic acid, etc., can be cited.

Further, it is even more preferable that 1,1,1-tris-(4-hydroxyphenyl)-ethane, α,α',α"-tris-(4-hydroxyphenyl)-1,3,5-tri-isopropylbenzene, etc., be used.

It is preferable that the amount of polyfunctional compound used be less than 0.03 mole per mole of aromatic dihydroxyl compound, more preferable that it be from 0.002 to 0.02 mole, and especially preferable that it be from 0.01 to 0.02 mole.

The amount of terminal hydroxyl groups in the aromatic polycarbonate depends on the molar ratio of the raw materials, i.e., the aromatic dihydroxyl compounds and the diester carbonates. For example, when using bisphenol A as the aromatic dihydroxyl compound and diphenyl carbonate as the carbonate diester, the end groups of the polycarbonate will be (I) phenolic residual groups derived from bisphenol A and (II) phenyl groups derived from the diphenyl carbonate. If the molar ratio of bisphenol A is increased, the equivalence ratio of (I)/(II) of the phenolic terminal groups (I) and non-phenolic terminal groups (II) in the polycarbonate so formed will increase.

When using the melt method of manufacturing polycarbonates, the molar ratio of bisphenol A (an aromatic dihydroxy compound) is generally large, and the amount of phenolic end groups in the aromatic polycarbonate so obtained will be at least 5% of the total end groups.

In addition, when manufacturing polycarbonates using the melt method in such a manner, an alkali metal compound or alkaline earth metal compound and a basic compound are normally used as a catalyst. Specifically, organic salts, inorganic salts, oxides, hydroxides, hydrides or alcholates of alkali metal compounds or alkaline earth metal compounds can be cited as being preferable as the alkali metal compound or alkaline earth metal compound.

Specifically, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium bromohydride, lithium bromohydride, phenylbromo-sodium, sodium benzoate, potassium benzoate, lithium benzoate, disodium hydrogenphospate, dipotassium hydrogenphosphate, dilithium hydrogenphospate, the sodium salt of bisphenol A, dipotassium salts, dilithium salts, the sodium salts of phenols, potassium salts, lithium salts, etc., can be cited as alkali metal compounds.

Specifically, calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc., can be cited as alkaline earth metal compounds.

The alkali metal compounds or the alkaline earth metal compounds mentioned above can also be used in combinations of two or more. In addition, alkali metal compounds and alkaline earth metal compounds can be used in combination.

For alkali metal compounds or the alkaline earth metal compounds such as these, it is preferable to use from $1 \times 10^{-8}$ to $1 \times 10^{-4}$ mole per mole of the above-mentioned aromatic dihydroxyl compound, more preferable from $1 \times 10^{-7}$ to $2 \times 10^{-6}$ mole, and is especially preferable to use from $1 \times 10^{-7}$ to $8 \times 10^{-7}$ mole.

As catalysts, if alkali metal compounds or the alkaline earth metal compounds are used in the amount of from $1 \times 10^{-8}$ to $1 \times 10^{-4}$ mole per mole of aromatic dihydroxyl compound, polymers with high polymerization activity can be manufactured.

In addition, basic compounds are used together with the alkali metal compounds or the alkaline earth metal compounds. It is desirable that these basic compounds exhibit, for example, ready decomposition at high temperatures. The following compounds can be specifically cited; to wit, ammonium hydroxide compounds that have alkyl, aryl, aralkyl, etc., groups such as tetramethyl ammonium hydroxide (Me$_4$NOH), tetraethyl ammonium hydroxide (Et$_4$NOH), tetra butyl ammonium hydroxide (Bu$_4$NOH), trimethylbenzyl ammonium hydroxide ((φ-CH$_2$)(Me)$_3$NOH), tertiary amines such as trimethylamine, triethylamine, dimethylbenzylamine, triphenylamine, etc., secondary amines represented by R$_2$NH (in the formula, R is an aryl group, etc., of an alkyl, phenol, tolyl, etc., such as methyl, ethyl, etc.), primary amines represented by RNH$_2$ (in the formula, R is synonymous to that described above), imidazoles such as 2-methylimidazole, 2-phenylimidazole, etc., basic salts such as ammonia, tetramethyl ammonium borohydride (Me$_4$NBH$_4$), tetrabutyl ammonium borohydride (Bu$_4$NBH$_4$), tetrabutyl ammonium tetraphenyl borate (Bu$_4$NB(Ph)$_4$), tetramethyl ammonium tetraphenyl borate (Me$_4$NB(Ph)$_4$), etc., and, phosphonium compounds such as tetramethyl phosphonium hydroxide, tetraethyl phosphonium hydroxide, tetraphenyl phosphonium hydroxide, etc.

Among these, it is preferable to use tetraalkyl ammonium hydroxide compounds, particularly, tetraalkyl ammonium hydroxide compounds for electronic use that contain few metallic impurities.

As for the basic compounds such as those described above, it is preferably to use from $1 \times 10^{-6}$ to $1 \times 10^{-1}$ mole for each mole of aromatic dihydroxyl compound, and more preferable to use from $1 \times 10^{-5}$ to $1 \times 10^{-2}$ mole.

If both alkali metal compounds or alkaline earth metal compounds and basic compounds are used in combination in the amounts described above, the polycondensation reaction can proceed with sufficient speed and is preferable to be able to form high-molecular-weight polymers with high polymerization activity.

When using catalysts such as those described above in the melt polymerization method, it is preferable to neutralize or weaken the reaction product by adding acidic compounds. Sulfonic acids such as benzenesulfonic acid, p-toluenesulfonic acid, etc., sulfonic acid esters such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, etc., can be used as such acidic substances.

In the melt method, as the purification involved in the phosgene method is essentially not carried out, it is preferable to process the polymer at reduced pressure after neutralizing the catalyst.

There are no particular limitations on the processing equipment when doing such reduced pressure processing, but it is also acceptable to use reactors equipped with a depressurization system, or to use an extruder equipped with a depressurization system.

When using such reaction vessels, it is acceptable use either a vertical or horizontal tank-type reactor, but it is preferable to use a horizontal tank-type reactor.

Reduced-pressure processing conducted using reactors like those described above is carried out at pressures from 0.05 to 750 mm Hg, and preferably at pressures below 0.05 to 5 mm Hg.

When using an extruder, it is preferable to carry out such reduced-pressure processing for about 10 seconds to 15 minutes, and when using a reactor, it is preferable to process for about 5 minutes to 3 hours. In addition, it is preferable to carry out reduced-pressure processing at a temperature of about 240° to 350° C.

In addition, when reduced-pressure processing is carried out in an extruder, it is acceptable to use either a vented uniaxial extruder or a biaxial extruder, and pelletization can also be carried out while doing reduced-pressure processing in an extruder.

When reduced-pressure processing is done in an extruder, the reduced-pressure processing is done at a pressure of about 1 to 750 mm Hg, and preferably under conditions of about 5 to 700 mm Hg.

Carrying out the processing as described above will reduce or completely eliminate raw material monomers remaining in the polycarbonate.

In addition, methods other than those which manufacture by reacting an aromatic dihydroxy compound with a carbonate precursor as described above exist in which a compounds having hydroxyl groups are reacted to form polycarbonate resins. For example, a polycarbonate having an arbitrary amount of terminal hydroxyl groups can be readily obtained by adding bisphenol A to a carbonate resin and mixing in an extruder. Various aromatic dihydroxy compounds bearing at least three phenolic hydroxy groups used in polycarbonate manufacturing previously cited as well as water can be cited as examples of compounds having such hydroxyl groups.

The metallic impurities present in aromatic polycarbonates which have a detrimental effect in terms of discoloration can be transition metals. Specifically, these are the metals Ti, Fe, Cr, Cu, Zn, V, Mo, Co, etc. These metals are frequently ionized within the polycarbonate and exist as ionized compounds. Ionized metal species readily form salts with other compounds (minute amounts of organic and inorganic compounds within the polycarbonate), leading to the formation of complexes. These metals or metal-ion compounds promote discoloration of the polycarbonate and lead to a reduction in molecular mass. Furthermore, these metallic ions form halogenides, for example, chlorides. It is well known that chlorine remains in polycarbonates [manufactured using] the halogen method. For example, Japan Examined Patent Publication (Kokoku) Sho 59-22743 indicates that this residual amount is 0.005 parts by weight per 100 parts by weight of polycarbonate. Such a large quantity of chlorine readily reacts with metals to form chlorides, and not only promotes thermal decomposition, but also worsens resistance to hydrolysis. In such polycarbonates manufactured using the phosgene method, the deactivating agent formulation should be optimized by giving careful consideration to the amount of impurities present.

On the other hand, in aromatic polycarbonates containing hydroxyl groups manufactured using melt methods, there is the possibility of promoting discoloration by metals or metallic ions reacting with terminal hydroxyl groups in the melt during polycarbonate manufacturing as well as during resin formation. Metal impurities other than transition metals can also be expected to have a similar detrimental effect. Specifically, Al, B, Sn as well as Sb which display Lewis acid characteristics can be cited. Contamination with these metals may be due to the raw materials used, or occur during the manufacturing stage and/or forming.

Compounds of iron are particularly troublesome in causing the polymer to have an increased yellow index after dwell and develop haze after hydrolysis test. The level of iron is not critical but haze and yellowing can occur when iron compounds calculated as iron are present in the polycarbonate in a level as low as 0.01 ppm. When the level of iron reaches 0.02 to 0.03 ppm without the appropriate level of phosphorous acid present, the haze level after hydrolysis makes the composition unacceptable for critical applications. When the level of iron compounds calculated as iron is at the level of 0.1, 0.2, or 0.3 ppm it is critical that the appropriate level of deactivating agent be present in the composition to meet the exacting standards of these critical applications. Thus, minute quantities of the iron compounds calculated as iron at any level can be detrimental to meeting critical quality standards of exacting applications, but presence of deactivating agent within the limits set forth herein surprisingly negates the melt polycarbonate quality issues caused by the presence of iron compounds.

The aromatic polycarbonate resin composition of one of the embodiments of this invention is characterized in that it contains phosphorous acid together with an aromatic polycarbonate resin as described above. It is desirable that the proportion of phosphorous acid per mole of impurity metals contained in the aromatic polycarbonate resin be at least 1 mole, more preferable that it be at least 3 moles, and even more preferable that it be at least 5 moles, and further, that it be less than 100 moles, more preferable that it be less than 50 moles, and even more preferable that it be less than 25 moles. If more phosphorous acid than that described above is added, acceptable thermal stability can be maintained, but there will be a marked drop in resistance to hydrolysis. It is especially desirable that this amount of phosphorous acid be less than 2 ppm of aromatic polycarbonate resin. Consequently, controlling the purity of the aromatic polycarbonate resin itself is important. In addition, in the final manufacturing stage in the melt method, obtaining the final product by adding such minute amounts of phosphorous acid from the extruder (together with other additives) during the time when the polycarbonate resin is molten and then pelletizing is extremely effective from the viewpoint of the final product being thermally stable and the pellets themselves having acceptable color.

The aromatic polycarbonate resin composition of a second embodiment of the present invention is characterized by containing a thioether compound together with the aforementioned aromatic polycarbonate resin. Thioether compounds eliminate the effect of metal impurities and exert an effect on thermal stability at high temperatures, and particularly on color tone stability. Examples of thioether compounds include tetrakis(methylene-3-dodecylthiopropionate)methane and ditridecylthiopropionate. The thioether compound should be contained in an amount of 1 mole or more, and preferably 50 moles or more, per mole of the metal impurities contained in the aromatic polycarbonate resin (and preferably per mole of iron), with an amount of 100 moles or more being particularly preferred, and it should be contained in an amount of 1,000 moles or less, and preferably 800 moles or less, with an amount of 500 moles or less being particularly preferred. If a greater amount is added, favorable thermal stability cannot be maintained, and hydrolysis resistance will markedly decrease. An amount of less than 500 ppm with respect to the aromatic polycarbonate resin is particularly preferred, and accordingly, control of the purity of the polycarbonate itself is important. Moreover, in the final manufacturing stage of the melt method, it is extremely effective if this thioether compound is added from an extruder (together with other additives) while the polycarbonate resin is in a molten state and it is then pelletized to obtain the final product, from the standpoint of the thermal stability of this final product and favorable color tone of the pellets themselves.

The aromatic polycarbonate resin composition of a third embodiment of the present invention is characterized by containing a phosphite diester together with the aforementioned aromatic polycarbonate resin. Phosphite diesters eliminate the effect of metal impurities and exert an effect on thermal stability at high temperatures, and particularly on color tone stability. An example of such phosphite diesters is the compound having the formula below:

$$R^dO-P(OR^e)OH$$

In the formula, Rd and Re are independent alkyl, aryl, or alkylaryl groups. Preferred examples include diphenyl hydrogenphosphite, bis(nonylphenylphenyl) hydrogenphosphite, bis(2,4-di-t-butylphenyl) hydrogenphosphite, dicresyl hydrogenphosphite, and bis(p-t-butylphenyl)hydrogenphosphite. These substances may be used individually or in combinations of two or more. Phosphite diesters having aromatic groups are more preferred.

The phosphite diester should be contained in an amount of 1 mole or more, and preferably 50 moles or more, per mole of the metal impurities contained in the aromatic polycarbonate resin and preferably per mole of iron, with an amount of 100 moles or more being particularly preferred, and it should be contained in an amount of 1,000 moles or less, and preferably 800 moles or less, with an amount of 500 moles or less being particularly preferred. If a greater amount is added, favorable thermal stability cannot be maintained, and hydrolysis resistance will markedly decrease. An amount of less than 500 ppm with respect to the aromatic polycarbonate resin is particularly preferred, and accordingly, control of the purity of the polycarbonate itself is important. Moreover, in the final manufacturing stage of the melt method, it is extremely effective if this phosphite diester is added from an extruder together with other additives while the polycarbonate resin is in a molten state and is then pelletized to obtain the final product, from the standpoint of the thermal stability of this final product and favorable color tone of the pellets themselves.

The aromatic polycarbonate resin composition of a fourth embodiment of the present invention is characterized by the fact that said composition contains a nitrogen-containing heavy metal deactivating agent together with the above mentioned aromatic polycarbonate resin. This nitrogen-containing heavy metal deactivating agent eliminates the effects of metal impurities, and thus has an effect on the thermal stability at high temperatures, and especially on the stability of the hue of the resin. Such nitrogen-containing heavy metal deactivating agents are nitrogen-containing organic compounds which are commercially marketed as heavy metal deactivating agents. For example, such compounds are marketed under the commercial names of CDA-6 and ZS-90 by Asahi Denka K.K.

The above mentioned nitrogen-containing heavy metal deactivating agent is added at the rate of 10 ppm or greater, preferably 30 ppm or greater, and even more preferably 50 ppm or greater, but 500 ppm or less, preferably 300 ppm or less, and even more preferably 200 ppm or less, relative to the weight of the above mentioned (A) aromatic polycarbonate resin. If a larger amount is added, the thermal stability can be favorably maintained; however, the resistance to hydrolysis drops conspicuously. Control of the purity of the polycarbonate itself is important. A process in which such a small amount of a nitrogen-containing heavy metal deactivating agent is added from the extruder (together with other additives) while the polycarbonate resin is in a molten state in the final stage of manufacture of the melt process, after which the final product is obtained by pelletization, is extremely effective from the standpoint of thermal stability of the final product and favorable hue of the pellets themselves.

In addition to the components described above, the resin composition of this invention can be further blended with thermal stabilizers, acid scavengers, weathering stabilizers, mold release agents, pigments, dyes, strengtheners, bulking agents, flame retardants, lubricants, plasticizers, anti-static agents, etc.

Thermal stabilizers are used to further thermally stabilize the aromatic polycarbonate. Phosphorous esters and/or phenolic antioxidants can be used. Compounds represented by, for example, the formula $$P(OR^c)_3$$

wherein $R^c$ represents an alicyclic carboxylic group, aliphatic carboxylic group or aromatic carboxylic group, each of which may be identical or different, can be cited as examples of phosphorous esters. Specifically, trialkyl phosphites such as
trimethyl phosphite,
triethyl phosphite,
tributyl phosphite,
trioctyl phosphite,
tris-(2-ethylhexyl)phosphite,
trinonyl phosphite,
tridecyl phosphite,
trioctadecyl phosphite,
tristearyl phosphite,
tris-(2-chloroethyl)phosphite,
tris-(2,3-dichloropropyl)phosphite, etc.;
tricycloalkyl phosphites such as
tricyclohexyl phosphite, etc.;
triaryl phosphites such as
triphenyl phosphite,
tricresyl phosphite,
tris-(ethylphenyl)phosphite,
tris-(2,4-di-t-butylphenyl)phosphite,
tris-(nonylphenyl)phosphite,
tris-(hydroxyphenyl)phosphite, etc.; and
arylalkyl phosphites such as
phenyldidesyl phosphite,
diphenyldesyl phosphite,
diphenylisooctyl phosphite,
phenylisooctyl phosphite,
2-ethylhexyldiphenyl phosphite, etc.,
can be cited as examples.

Further, distearylpentaerythryl diphosphite, bis-(2,4-di-t-butylphenyl)-pentaerythryl diphosphite, etc., can also be cited.

These compounds can be used alone or in combination.

Among these, it is preferable to use aromatic phosphorous esters, in particular, tris-(2,4-di-t-butylphenyl)phosphite.

Any phenolic compound normally used as an antioxidant in this field can be used, in particular, hindered phenolic compounds, specifically, n-octadecyl-3-(4-hydroxy-3',5'-di-t-butylphenyl)-proprionate, methane tetrakis-[methylene-3-(3'5'-di-t-butyl-4-hydroxyphenyl)-proprionate], butane 1,1,3-tris-(2-methyl-4-hydroxy-5-t-butylphenyl), distearyl-(4-hydroxy-3-methylphenyl-5-t-butyl)-benzylmalonate, 4-hydroxymethyl-2,6-di-t-butylphenol, etc., can be cited as examples. These may be used alone or two or more compounds may be used in combination.

Thermal stabilizers are used as necessary according to the amount of deactivating agent (B) as well as the purity of the aromatic polycarbonate (A) component (in particular, depending on the amount of metallic ions present). The addition of such deactivating agents is mainly effective against decreases in molecular weight during heating. When phosphorous esters are used alone, the amount of additive is normally less than 0.1 part by weight for 100 parts by weight of aromatic polycarbonate, preferably less than 0.05 parts by weight, and more preferably less than 0.03 parts by weight, and further, it preferably at least 0.0005 parts per weight, and more preferably, at least 0.001. When phenolic antioxidants are used alone, the amount is less than 0.1 parts by weight for 100 parts by weight of aromatic polycarbonate, preferably less than 0.05 parts by weight, and more preferably less than 0.03 parts by weight; and further, at least 0.0005 parts by weight, and more preferably at least 0.001 parts by weight. Used in this range, these amounts are optimal to exhibit the effects of improving thermal stability, avoiding hydrolysis as well as preventing mold contamination. In addition, phosphorous esters and phenolic antioxidants can be used in combination.

Compounds having, for example, at least one epoxy group in a single molecule are used as acid scavengers. Specifically, epoxidized soybean oil,
epoxidized linseed oil,
phenylglycidyl ether,
allylglycidyl ether,
t-butylphenylglycidyl ether,
3,4-epoxyhexylmethyl-3',4'-epoxycyclohexyl carboxylate,
3,4-epoxy-6-methylcyclohexylmethyl-3',4'-epoxy-6'methylcyclohexyl carboxylate,
2,3-epoxycyclohexylmethyl-3',4'-epxycyclohexyl carboxylate,
4-(3,4-epoxy-5-methylcyclohexyl)-butyl-3'4'-epoxycyclcohexyl carboxylate,
3,4-epoxycyclohexyl ethylene oxide,
cyclohexylmethyl-3,4-epoxycyclohexyl carboxylate,
3,4-epoxy-6-methylcyclohexylmethyl-6'-methylcyclohexyl carboxylate,
bisphenol A diglycidyl ether,
tetrabromo-bisphenol A glycidylether,
diglycidyl esters of phthalic acid,
diglycidyl esters of hexahydrophthalic acid,
bis-epoxy-cyclopentadienyl ether,
bis-epoxy-ethylene glycol,
bis-epoxy-cyclohexyladipate,
butadiene epoxide,
tetraphenyl ethylene epoxide,
octylepoxytallate,
epoxidized polybutadiene,
3,4-methyl-1,2-epoxycyclohexane,
3,5-dimethyl-1,2-epoxycyclohexane,
3-methyl-5-t-butyl-1,2-epoxycyclohexane,
octadecyl-2,2-dimethyl-3,4-epoxycyclohexyl carboxylate,
N-butyl-2,2-dimethyl-3,4-epoxycyclohexyl carboxylate,
cyclohexyl-2-methyl-3,4-epoxy-5-methylcyclohexyl carboxylate,
octadecyl-3,4-epoxycyclohexyl carboxylate,
2-ethylhexyl-3',4'-epoxycyclohexyl carboxylate,
4,6-dimethyl-2,3-epoxycyclohexcyl-3'4'-epoxycyclohexyl carboxylate,
4-5-epoxy-tetrahydrophthalic anhydride,
3-t-butyl-4,5-epxoy-tetrahydrophthalic anhydride,
diethyl-4,5-epoxy-cis-1,2-cyclohexyl dicarboxylate,
di-n-butyl-3-t-butyl-4,5-epoxy-cis-1,2-cyclohexyl dicarboxylate, etc., can be cited as examples. Among these, it is preferable to use alicyclic epoxy compounds, and in particular, it is preferable to use 3,4-epoxycyclohexylmethyl-3',4'-epoxycyclohexyl carboxylate. These compounds may be used alone or in mixtures of two or more compounds together.

The main purpose of acid scavengers is to scavenge components that exhibit acidity, primarily so that they do not to have a detrimental impact on resistance to hydrolysis. Acid scavengers are added as necessary corresponding to the amount of added deactivating agent (B) and the amount of added thermal deactivating agent described above. Normally, less than 0.1 parts by weight for 100 parts by weight of aromatic polycarbonate is added, preferably less than 0.05 parts by weight, and more preferably, less than 0.03 parts by weight; and further, at least 0.0005 parts by weight and preferably 0.001 parts by weight.

Weathering stabilizers are used when applications demand weather resistance. Benzotriazole-related compounds can be cited as examples of weathering stabilizers. Specifically, 2-(2'-hydroxy-5'-methyl-phenyl) benzotriazole,
2-(2'-hydroxy-3',5'-di-t-butyl-phenyl) benzotriazole,
2-(2'-hydroxy-3'-t-butyl-5'-methyl-phenyl)-5-chlorobenzotriazole,
2-(2'-hydroxy-5'-t-octylphenyl) benzotriazole,
2-(2'-hydroxy-3',5'-di-t-amylphenyl) benzotriazole, 2-[2'-hydroxy-3'-(3",4",5",6"-tetrahydrophthalomethyl)-5'-methylphenyl]benzotriazole,
2,2'-methylene-bis[4-(1,1,3,3-tetramethylbutyl)-6-(2H-benzotriazole-2-il) phenol], etc., can be cited.

The amount of weathering stabilizer is normally less than 0.5 parts by weight for 100 parts by weight of aromatic polycarbonate, preferably less than 0.4 parts by weight, and more preferably less than 0.3 parts by weight; and further, is at least 0.05 parts by weight, and more preferably, at least 0.1 parts by weight.

As for mold release agents, at least one compound selected from among the group consisting of partial or full esters with aliphatic carboxylic acids and polyhydric alcohols, silicone-related compounds as well as olefin-related compounds can be cited as examples. There are no particular restrictions on the polyhydric alcohol, and dihydric, trihydric, tetrahydric, pentahydric, and hexahydric [alcohols] can be used, but ethylene glycol, glycerin, trimethylolpropane, pentaerythritol, etc., are preferred. There are no particular restrictions on the aliphatic carboxylic acid, and both saturated and unsaturated aliphatic carboxylic acids can be used. For example, hydrogenated animal oils can be used. Saturated monovalent fatty acids are preferred as carboxylic acids, , and ones having from 12 to 24 carbon atoms are especially preferred. If the number of carbon atoms is fewer than the aforementioned range, there is a tendency for the thermal stability of the resin composition to deteriorate compared to ones in the aforementioned range, and in addition, gas generation readily occurs. On the other hand, if the number of carbon atoms is greater than the aforementioned range, there is a tendency for the mold release properties of the resin composition to deteriorate compared to ones within the aforementioned range. Specifically, dodecylic acid, dodecylic acid, myristic acid, pentadecylic acid, palmitic acid, heptadecylic acid, stearic acid, nonadecanoic acid, arachic acid, behenic acid, lignoceric acid, etc., can be cited as examples of aforementioned aliphatic carboxylic acid. Silicone oil can be cited as a silicone-related compound. And α-olefin oligomer can be cited as a olefin-related compound.

Mold release agents are used in situations that demand mold releasability and the amount is normally less than 0.5 parts by weight for 100 parts by weight of aromatic polycarbonate, preferably less than 0.4 parts by weight, and more preferably less than 0.3 parts by weight; and further, is at least 0.005 parts by weight, and more preferably, at least 0.01 parts by weight.

There are no particular restrictions on the method used to manufacture the resin compound of this invention, and ordinary methods can be used satisfactorily. Nevertheless, in general, melt mixture methods are preferable. Small amounts of catalyst can be used, but are generally unnecessary. An extruder, Bumbury mixer, roller, kneader, etc., can be specifically cited as equipment, and these can be operated batch-wise or continuously.

This invention will be explained based on the examples below, but this invention is not limited to these examples.

It should also be noted that the examples and comparative examples used the following constituents.

(A) a polycarbonate having hydroxyl groups as its end groups was fabricated as follows:

0.44 kilomole of bisphenyl A (BPA) as the aromatic dihydroxyl compound and 0.46 kilomoles of diphenyl carbonate as the carbonate diester were prepared in a 250-liter tank-type mixing vessel, and after evacuation and replacement with nitrogen, were melted at 140° C.

Next, the temperature of this mixture was raised to 180° C. and 0.000176 mole of sodium hydroxide (4×10−7 mole/mole of bisphenol A) and 0.11 mole of tetramethyl ammonium hydroxide (2.5×10−4 mole/mole of bisphenol A) were added as catalysts, and the mixture was agitated for 30 minutes.

Next, the temperature was raised to 210° C. simultaneous with a gradual reduction in pressure to 200 mm Hg. After 30 minutes, the temperature was raised to 240° C. simultaneous with a gradual reduction in pressure to 15 mm Hg. The amount of phenol distilled off was measured while keeping the temperature and pressure constant. At the point when no further phenol was distilled off, the mixture was returned to atmospheric pressure under nitrogen. The time required for the reaction was one hour. The limiting viscosity [η] of the reaction product so obtained was 0.15 dl/g.

A gear pump was used to raise the pressure of this reaction product, which was then fed into a centrifugal thin-film evaporator which promotes the reaction. The temperature and pressure of the thin-film evaporator were controlled at 270° C. and 2 mm Hg, respectively. It is then fed via a gear pump from the bottom of the evaporator into a twin-screw horizontal agitated polymerization vessel (L/D=3, agitation vane rotational diameter=220 mm, internal volume=20 liters) controlled at 293° C. and 0.2 mm Hg and was polymerized with a dwell time of 30 minutes.

Next, a gear pump was used to feed this polymer in the molten state into a twin-screw extruder (L/D=17.5, barrel temperature=285° C.) where 0.7 ppm of p-butyl-toluenesulfonate per part of resin is added and mixed in. It is then made into pellets by extruding in strand form through a die and cutting using a cutter.

The intrinsic viscosity [η] of the polymer so obtained was 0.51 dl/g. Phenolic terminal groups made up 12% of the total end groups. In addition, analysis using the flameless atomic absorption spectroscopy method indicated the amount of metal contained as metallic impurities to be 0.025 ppm calculated as iron. This polycarbonate is designated as PC.

It should also be noted that the OH-group concentration of the phenolic end groups was determined by measuring the absorption strength at 3,600 cm−1 using Fourier Transform Infrared Spectroscopy (FTIR). The concentration of total end groups was measured by determining the original average molecular weight based on a value for intrinsic viscosity (IV) measured in a methylene chloride solvent. The Schnell formula, IV=1.23×10−4M0.83 (where M=viscosity average molecular weight), was used to convert this IV value to average molecular weight.

(B)(1) Phosphorous acid

A 50% aqueous solution was used (values in Table 1 are amounts of phosphorous acid)

EXAMPLE 1 AND COMPARATIVE EXAMPLES 1 TO 3

(1) Manufacture of the Resin Composition

As shown in Table 1, component (B)(1) phosphorous acid was mixed with 100 parts of the polycarbonate (PC) obtained as described above. This was melted and mixed at 280° C. using a single-screw extruder (L/D=17.5), and formed into pellets.

(2) Evaluation

Evaluation was performed as follows.

Yellow Index

A 150-ton molding machine manufactured by Okuma Corporation was used to form an injection molded article with a thickness of 3.0 mm at a cylinder temperature of 280° C. and a mold temperature of 80° C. Using this molded article, X, Y, and Z values were measured using the transmissive method with an ND-1001 DP Color and Color Difference Meter manufactured by Nippon Denshoku Kogyo Co., Ltd., and the yellow index (YI) was determined.

YI=100×(1.277 X−1.060 Z)/Y

Optical Transmissivity

Optical transmissivity was measured using the above-mentioned molded article according to the method set forth in ASTM standard D-1003.

Haze

The haze in the above-mentioned molded article was measured using an NDH-200 manufactured by Nippon Denshoku Kogyo Co., Ltd.

Resistance to Hydrolysis

The above-mentioned molded article was placed in an autoclave filled with pure water, placed in an oven at 120° C. and aged for five days. After the test period, the haze was measured and taken as an indicator of hydrolysis.

Dwell-Time Stability

The resin was retained within the cylinder of the above-mentioned molding machine for 15 hours at a temperature of 320° C. It was then molded at this temperature and the yellow index (YI) measured.

The results of the above evaluation are given in Table 1.

EXAMPLES 2 TO 6 AND COMPARATIVE EXAMPLES 4 TO 6

(1) Manufacture of the Resin Composition

Phosphorous acid and the iron (III) salt of acetylacetone (described as the amount of iron in Table 1) was mixed with the polycarbonate (PC) in the proportions indicated in Table 1. A resin composition was manufactured in a manner identical to Example 1 and pellets were formed.

(2) Evaluation

An evaluation was performed in a manner identical to Example 1. The results are given in Table 1.

TABLE 1

|  | Examples | | | | | | Comparative Examples | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Amount of iron additive (ppm) | 0 | 0.1 | 0.1 | 0.1 | 0.1 | 0.1 | 0 | 0 | 0 | 0.1 | 0.1 | 0.1 |
| Phosphorous acid (ppm) | 1.5 | 0.5 | 0.9 | 1.7 | 4.9 | 8.5 | 0 | 4.5 | 9 | 0 | 26 | 52 |
| Phosphorous acid/iron* (Molar ratio) | 41 | 3 | 5 | 10 | 29 | 50 | — | 123 | 246 | — | 150 | 300 |
| YI (initial) | 1.4 | 1.8 | 1.6 | 1.4 | 1.3 | 1.3 | 1.5 | 1.3 | 1.2 | 2.9 | 1.3 | 1.3 |
| YI (after dwell) | 1.8 | 2.2 | 2.1 | 1.9 | 1.7 | 1.7 | 2.1 | 1.6 | 1.3 | 4.3 | 1.7 | 1.6 |
| Haze (initial) | 0.1 | 0.2 | 0.2 | 0.2 | 0.2 | 0.2 | 0.2 | 0.1 | 0.1 | 0.3 | 0.2 | 0.2 |
| Haze (after hydrolysis test) | 2.0 | 5 | 4.9 | 4.8 | 30.1 | 68.3 | 0.3 | 25.3 | 65 | 8.6 | >90 | >90 |

*Molar ratio of phosphorous acid with respect to total amount of iron [iron contained in the PC resin and added iron]

(B)(2) Thioether Compound

Tetrakis(methylene-3-dodecylthiopropionate)methane

EXAMPLE 7 AND COMPARISON EXAMPLES 7 AND 8

(1) Manufacturing of Resin Composition

The thioether compound of component (B)(2) was blended with polycarbonate (PC) obtained as described above, mixed as shown in Table 2, and melt-kneaded at 280° C. in a uniaxial extruder (L/D=17.5) to make pellets.

(2) Evaluation

An evaluation was performed in a manner identical to Example 1. The results are given in Table 2.

The above evaluation results are shown in Table 2.

EXAMPLES 8 AND 9 AND COMPARISON EXAMPLES 9 AND 10

(1) Manufacturing of Resin Composition 0.1 ppm of iron (III) salt of acetyl acetone (the amount thereof is shown in Table 2 as iron) and the amounts shown in Table 2 of thioether compounds were mixed with polycarbonate (PC), and resin compositions were manufactured in the same manner as in Example 7 and made into pellets.

(2) Evaluation

Evaluation was conducted in the same manner as in Example 1. The results are shown in Table 2.

TABLE 2

|  | Examples | | | Comparison examples | | | |
| --- | --- | --- | --- | --- | --- | --- | --- |
|  | 7 | 8 | 9 | 7 | 8 | 9 | 10 |
| Amount of iron added (ppm) | 0 | 0.1 | 0.1 | 0 | 0 | 0.1 | 0.1 |
| Thioether compound (ppm) | 50 | 120 | 240 | 0 | 750 | 0 | 3600 |
| Thioether compound/iron* (Molar ratio) | 100 | 50 | 100 | — | 1500 | — | 1500 |
| YI (initial period) | 1.4 | 1.5 | 1.4 | 1.5 | 1.2 | 2.9 | 1.5 |
| YI (after retention) | 1.6 | 1.8 | 1.8 | 2.1 | 1.4 | 4.3 | 1.7 |
| Haze (initial period) | 0.2 | 0.3 | 0.3 | 0.2 | 0.2 | 0.3 | 0.3 |
| Haze (after hydrolysis test) | 5.1 | 7.3 | 12.6 | 0.3 | 75.3 | 8.6 | >90 |

*Molar ratio of thioether compound to total amount of iron [iron contained in PC resin and added iron (moles)]

(B)(3) Phosphite Diester

Diphenyl hydrogenphosphite

EXAMPLES 10 AND 11 AND COMPARISON EXAMPLES 11 and 12

(1) Manufacturing of Resin Composition

The phosphite diester of component (B)(3) was blended with polycarbonate (PC) obtained as described above, mixed as shown in Table 3, and melt-kneaded at 280° C. in a uniaxial extruder (L/D=17.5) to make pellets.

(2) Evaluation

Evaluation was conducted in the same manner as in Example 1. The results are shown in Table 3.

EXAMPLES 12 AND 13 AND COMPARISON EXAMPLES 13 AND 14

(1) Manufacturing of Resin Composition 0.1 ppm of iron (III) salt of acetyl acetone (the amount thereof is shown in Table 1 as iron) and the amounts shown in Table 3 of the phosphite diester of component (B)(3) were mixed with polycarbonate (PC), and resin compositions were manufactured in the same manner as in Example 10 and made into pellets.

(2) Evaluation

Evaluation was conducted in the same manner as in Example 1. The results are shown in Table 3.

TABLE 3

|  | Examples | | | | Comparison examples | | | |
| --- | --- | --- | --- | --- | --- | --- | --- | --- |
|  | 10 | 11 | 12 | 13 | 11 | 12 | 13 | 14 |
| Amount of iron added (ppm) | 0 | 0 | 0.1 | 0.1 | 0 | 0 | 0.1 | 0.1 |
| Phosphite diester (ppm) | 5 | 10 | 10.4 | 52 | 0 | 150 | 0 | 780 |
| Phosphite diester/iron* (Molar ratio) | 50 | 100 | 20 | 100 | — | 1500 | — | 1500 |
| YI (initial period) | 1.4 | 1.3 | 1.6 | 1.4 | 1.5 | 1.3 | 2.9 | 1.3 |
| YI (after retention) | 1.6 | 1.5 | 1.8 | 1.6 | 2.1 | 1.4 | 4.3 | 1.5 |
| Haze (initial period) | 0.2 | 0.2 | 0.3 | 0.2 | 0.2 | 0.2 | 0.3 | 0.2 |
| Haze (after hydrolysis test) | 2.4 | 5.1 | 9.3 | 12.3 | 0.3 | >90 | 8.6 | >90 |

*Molar ratio of phosphite diester to total amount of iron [iron contained in PC resin and added iron (moles)]

(B)(4) Nitrogen-Containing Heavy Metal Deactivating Agent

Adekastab ZS-90 (commercial name, nitrogen-containing organic compound, manufactured by Asahi Denka K.K.).

EXAMPLE 14 AND COMPARATIVE EXAMPLE 15

(1) Manufacture of Resin Composition

Component (B)(4), i.e., a nitrogen-containing heavy metal deactivating agent, was added as shown in Table 4 to the polycarbonate (PC) thus obtained, and this mixture was melted and kneaded at 280° C. using a single-shaft extruder (L/D=17.5), thus producing pellets.

(2) Evaluation

Evaluation was conducted in the same manner as in Example 1. The results are shown in Table 4.

EXAMPLES 15 AND 16 AND COMPARATIVE EXAMPLES 16 AND 17

(1) Manufacture of Resin Composition

An iron (III) salt of acetylacetone (amount of iron shown in Table 4) was added to the polycarbonate (PC) at the rate of 0.1 ppm, and a nitrogen-containing heavy metal deactivating agent was added in the amount shown in Table 4. A resin composition was then manufactured and pellets were prepared in the same manner as in Example 1.

(2) Evaluation

Evaluation was conducted in the same manner as in Example 1. The results are shown in Table 4.

TABLE 4

|  | Example | | | Comparative Example | | |
| --- | --- | --- | --- | --- | --- | --- |
|  | 14 | 15 | 16 | 15 | 16 | 17 |
| Amount of iron added (ppm) | 0 | 0.1 | 0.1 | 0 | 0.1 | 0.1 |
| Nitrogen-containing heavy metal deactivating agent (ppm) | 50 | 100 | 300 | 0 | 0 | 1000 |
| YI (Initial) | 1.4 | 1.8 | 1.6 | 1.5 | 2.9 | 1.5 |
| YI (After residence) | 1.9 | 2.1 | 1.9 | 2.1 | 4.3 | 1.8 |
| Haze (Initial) | 0.2 | 0.3 | 0.3 | 0.2 | 0.3 | 0.4 |
| Haze (After hydrolysis test) | 1.2 | 4.6 | 5.3 | 0.3 | 8.6 | >90 |

The resin composition of this invention has excellent thermal stability, color stability, and resistance to hydrolysis, and further, mold contamination during long-term molding is extremely low. Consequently, it is ideal for applications demanding transparency, for example, optical applications such as lenses, optical disks, etc., or building materials such as sheets, films, etc. In addition, by exploiting its stability, it can also be used as a strengthened polycarbonate resin formed by mixing with fillers, as an alloy with other polymers, etc., and has extremely high industrial utilization value.

We claim:

1. A polycarbonate resin composition comprising (A) an aromatic polycarbonate resin containing hydroxyl groups in the proportion of least 5% of total end groups and a metal impurity and (B) an amount of a deactivating agent selected from the group consisting of phosphorous acid wherein the amount is from about 1 to about 100 moles per mole of metal impurity contained in component (A), a thioether compound wherein the amount is from about 1 to about 1,000 moles per mole of metal impurity contained in component (A), a phosphite diester wherein the amount is from about 1 to about 1,000 moles per mole of metal impurity contained in component (A) and a nitrogen-containing organic compound wherein the amount is from about 10 to 500 ppm per part by weight of component (A).

2. A composition according to claim 1 in which the (A) aromatic polycarbonate resin is manufactured by a melt polymerization reaction of an aromatic dihydroxy compound with a carbonate diester.

3. A composition according to claim 2 further comprising from $1 \times 10^{-8}$ to $1 \times 10^{-4}$ mole of an alkali metal compound or alkaline earth metal compound and from $1 \times 10^{-6}$ to $1 \times 10^{-1}$ mole of a basic compound per mole of aromatic dihydroxyl compound.

4. A composition according to claim 1 wherein the metal impurity is an iron compound.

5. A composition according to claim 1 in which (B) is phosphorous acid.

6. A composition according to claim 5 wherein the metal impurity is an iron compound.

7. A composition according to claim 6 wherein the iron compound calculated as iron is present in an amount of 0.01 ppm.

8. A composition according to claim 5 wherein (B) phosphorous acid is present in no more than 2 ppm.

9. A polycarbonate resin composition comprising (A) an aromatic polycarbonate resin containing hydroxyl groups in the proportion of least 5% of total end groups and an iron compound impurity and (B) phosphorous acid, wherein the amount of (B) phosphorous acid contained therein is in the proportion of from 1 to 100 moles per mole of metal impurity contained in constituent (A) but is not more than 2 ppm.

10. The composition according to claim 1 wherein (B) is a thioether compound.

11. A composition according to claim 9 wherein the metal impurity is an iron compound.

12. A composition according to claim 10 wherein the iron compound calculated as iron is present in an amount of 0.01 ppm.

13. The composition according to claim 1 wherein (B) is a phosphite diester.

14. The composition according to claim 12 wherein the phosphite diester is selected from among phosphite diesters having aromatic groups.

15. A composition according to claim 13 wherein the metal impurity is an iron compound.

16. A composition according to claim 14 wherein the iron compound calculated as iron is present in an amount of 0.01 ppm.

17. The composition according to claim 1 wherein (B) is a nitrogen-containing organic compound.

18. A composition according to claim 16 wherein the metal impurity is an iron compound.

19. A composition according to claim 17 wherein the iron compound calculated as iron is present in an amount of 0.01 ppm.

20. A polycarbonate resin composition comprising (A) an aromatic polycarbonate resin which contains hydroxy groups at the rate of 5% or greater relative to the total terminal groups and a metal impurity, and (B) a nitrogen-containing organic compound in an amount of from 10 to 500 ppm per part by weight of component (A) whereby the compound deactivates the metal impurity and stabilizes the composition.

* * * * *